United States Patent
Lynch et al.

(10) Patent No.: US 6,628,036 B1
(45) Date of Patent: Sep. 30, 2003

(54) ELECTRICAL CURRENT TRANSFERRING AND BRUSH PRESSURE EXERTING SPRING DEVICE

(75) Inventors: William A. Lynch, Philadelphia, PA (US); Neal A. Sondergaard, Severna Park, MD (US); Thomas H. Fikse, West Chester, PA (US); Lynn J. Petersen, Oxford, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/143,893

(22) Filed: May 8, 2002

(51) Int. Cl.[7] .............................................. H02K 13/00
(52) U.S. Cl. .................. 310/242; 310/247; 310/239; 310/245; 439/29
(58) Field of Search ................... 310/242, 247, 310/239, 240, 241, 244, 245, 246; 439/29

(56) References Cited

U.S. PATENT DOCUMENTS

| | | | |
|---|---|---|---|
| 1,253,265 A | 1/1918 | McKeown | |
| 1,668,381 A | 5/1928 | Schild | |
| 1,812,609 A | 6/1931 | Rogers | |
| 2,230,131 A | 1/1941 | Chandeysson | |
| 3,735,173 A | * 5/1973 | Wisniewski | 310/242 |
| 4,246,508 A | * 1/1981 | Zimmer | 310/242 |
| 4,297,605 A | * 10/1981 | Tak | 310/242 |
| 4,311,936 A | * 1/1982 | Ozaki et al. | 310/242 |
| 4,513,495 A | * 4/1985 | Kimberlin | 29/597 |
| 4,544,874 A | * 10/1985 | Weldon et al. | 322/10 |
| 4,587,723 A | * 5/1986 | Scuro | 29/597 |
| 4,607,184 A | * 8/1986 | Takahashi et al. | 310/247 |
| 4,625,136 A | * 11/1986 | Kipke | 310/239 |
| 4,978,877 A | 12/1990 | Quirijnen | |
| 5,723,932 A | * 3/1998 | Ito et al. | 310/248 |
| 6,404,094 B1 | * 6/2002 | Drexlmaier et al. | 310/239 |

* cited by examiner

Primary Examiner—Karl Tamai
Assistant Examiner—Leda Pham
(74) Attorney, Agent, or Firm—Jacob Shuster

(57) ABSTRACT

A serpentine-shaped spring device having an internal core made of braided wires coated with elastomeric material for environmental protection and to enhance exertion of a low holding spring pressure on a metal fiber brush, when the spring device is suitably anchored at a stationary location to hold the brush in contact with a rotor during rotation thereof while conductively transferring electrical current thereto from the core of the spring device.

3 Claims, 1 Drawing Sheet

ELECTRICAL CURRENT TRANSFERRING AND BRUSH PRESSURE EXERTING SPRING DEVICE

The present invention relates generally to the transfer of electrical current between spaced surfaces.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

An important object of the present invention is to increase performance and reduce maintenance in electric power production, distribution and utilization systems, such as found on present and future naval ships and submarines. An example would include electrical current transfer devices associated with homopolar motors which may be used in future naval propulsion systems.

SUMMARY OF THE INVENTION

In accordance with the present invention, electrical energy is transferred from a DC power source to the stator of a homopolar motor, through an input conductor suitably fastened to a composite type of spring device exerting a low holding force on a stationary brush to conduct electrical current to metal fibers of such brush soldered to the spring device to thereby position the brush in contact with the moving surface of a rotor with reduced wear. The spring device has a serpentine shape and a flexible braided wire core that is elastomerically coated to provide protection and enhance establishment of the requisite degree of brush holding force and thereby also avoid use of hard pipes for current conducting purposes.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
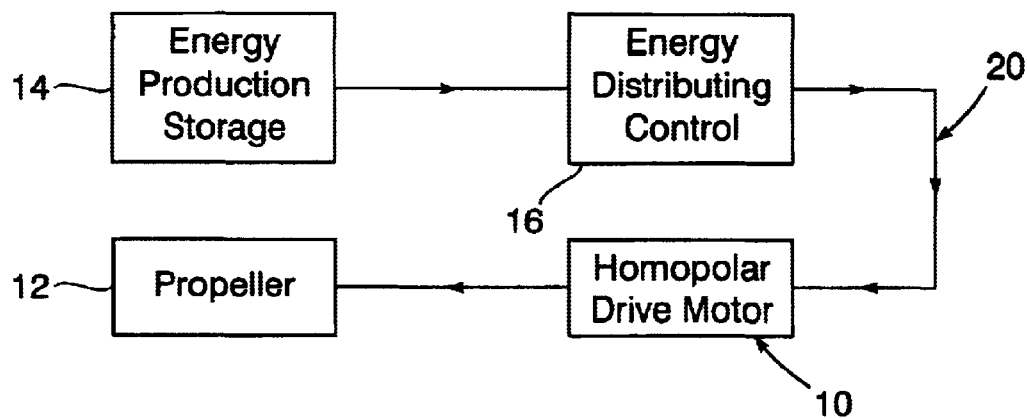
FIG. 1 is a block diagram illustrating a typical environment for use of the present invention within a homopolar motor.

Referring now to the drawing in detail, FIG. 1 diagrams a typical environment for an electric homopolar type motor 10, driving electrically powered equipment or functioning part thereof, such as a propulsion system having propellers 12 associated with an all-electric powered marine vessel or other auxiliary devices in such a vessel. The electrical energy is derived from a suitable energy storage or production system 14 connected to an energy distribution control subsystem 16 from which DC electrical energy is supplied to the homopolar drive motor 10, and to other equipment for operation onboard the marine vessel, such as weapons in the case of naval ships or submarines.

Figure 2:
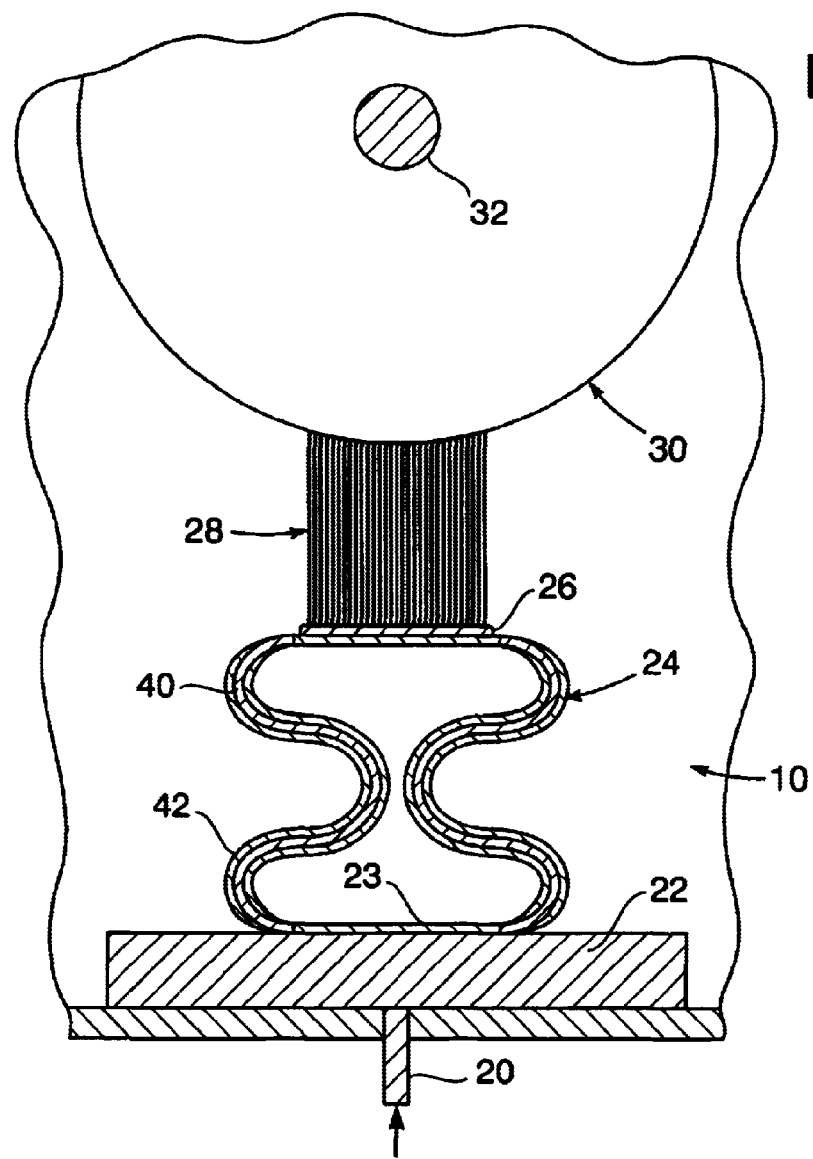
FIG. 2 is a partial section view of a portion of the homopolar motor diagrammed in FIG. 1, embodying the present invention.

Referring now to the homopolar drive motor 10, it receives its input energy from the energy storage 14 through the control 16 as a source of DC power. As shown in FIG. 2, DC electrical energy from such source 14, which is fed through means well known in the art, is conducted through a current transmission element 20 into a current conductor component 22 of the motor 10. One axial end of a low force exerting spring device 24 associated with the stator of the motor 10 is secured to the current conductor component 22 by press-fit, using a leaf spring and gold plated solder contact 23. The spring device 24 has a solder joint 26 on its other axial end through which it holds attached thereto a metal fiber brush 28 in contact with a rotor 30 of the homopolar motor 10, through which combinations of electric and magnetic fields are established imparting rotation to the rotor 30 in a manner well known in the art, so as to effect rotation of its output shaft 32.

As shown in FIG. 2 the conductor component 22 and the spring device 24 are constructed so as to conduct DC electrical current and maintain appropriate holding pressure on the brush 28 for contact with the moving surface on the rotor 30 and efficient operation of the motor 10. The spring device 24 has a serpentine shape as shown in FIG. 2 so as to exhibit axial flexibility and apply the spring pressure holding force on the brush 28 attached thereto for contacting the rotor 30 with reduced wear. The spring device 24 is formed from an inner flexible core 40 made of braided layers of electrical wires, with an elastomeric coating 42 thereon, such as silicone rubber of varying thickness on opposite sides thereof.

Based on the foregoing description, it will be apparent that the spring device 24 acts as a slip ring in the homopolar type motor 10 to allow use of the rotating rotor 30 with the stationary brush 28. Such spring device 24 being formed from a single part reliably collects and passes electrical current through its core 40 into the stationary brush 28, as well as to exert a spring holding force pushing the brush 28 against the rotating rotor 30 to an appropriate degree so as to minimized wear without lateral contact on the spring device 24 or the brush 28 as shown in FIG. 2. Also, because of its serpentine shape, the spring device 24 provides relatively large surface areas for improved heat dissipation as well as improved mechanical interfacing with the brush 28 through firm soldered joints 23 and 26 so as to allow for excellent electrical connection and ease of motor assembly. The elastomeric coating 42 improves the spring characteristic of its spring device 24, as well as to provide environmental protection.

The interfitting assembly of the conductor component 22, the spring device 24 and the brush 28, which was hereinbefore described within the environment of the homopolar motor 10 so as to function as a slip ring or commutator through which electrical energy is reliably transferred, may also be applicable to other electrical systems including those requiring a slip ring or commutator.

Obviously, other modifications and variations of the present invention may be possible in light of the foregoing descriptions, including transfer of electrical energy between two moving surfaces as in the case of a counter-rotating machine, as well as to provide a benefit in fixed applications which require flexibility vibration and expansion. It is therefore to be understood that within the scope of the appended claims the invention may be practiced otherwise than as specifically described.

What is claimed is:

1. In combination with a metal fiber brush adapted to be held in contact with a moving surface for transfer of electrical current thereto from a stator location spaced therefrom; spring means anchored at said stator location and shaped for both conducting said electrical current to the brush and establishing said contact thereof with said moving surface under a holding force with reduced wear and without lateral contact guidance, said spring means embodying wiring, and solder joint means for attaching the spring means to the brush and through which the electrical current is conducted to the brush from the wiring.

2. A brush assembly for an electrical machine having a rotor and a stator, said brush assembly comprising: a brush having longitudinal conductive fibers extending between opposite axial ends respectively in sliding contact with said rotor and fixed to a solder joint; a serpentine-shaped spring having spaced end portions; said solder joint being positioned on one of the end portions of the spring; a current conductor component fixed to the stator and in press fit engagement with the other of the end portions of the spring to thereby exclusively maintain the brush fibers under a low force pressure of the spring attached thereto by the solder joint; and wiring means associated with the spring for conducting electrical current from the current conductor component to the rotor through the solder joint and the brush fibers.

3. The brush assembly as defined in claim 2, wherein said wiring means comprises: a flexible inner core of the spring, which has braided layers positioned over the said inner core.

* * * * *